United States Patent
Fetterman et al.

(10) Patent No.: US 9,215,948 B2
(45) Date of Patent: Dec. 22, 2015

(54) APPARATUS AND SYSTEM FOR LOW-TEMPERATURE COOKING

(71) Applicant: Nomiku Inc., San Francisco, CA (US)

(72) Inventors: Abraham Fetterman, San Francisco, CA (US); Lisa Qiu Fetterman, San Francisco, CA (US); Wipop Bam Suppipat, San Francisco, CA (US)

(73) Assignee: Nomiku, Inc., San Francisco, CA (US)

( * ) Notice: Subject to any disclaimer, the term of this patent is extended or adjusted under 35 U.S.C. 154(b) by 310 days.

(21) Appl. No.: 13/780,890

(22) Filed: Feb. 28, 2013

(65) Prior Publication Data

US 2013/0220143 A1    Aug. 29, 2013

Related U.S. Application Data

(60) Provisional application No. 61/605,160, filed on Feb. 29, 2012.

(51) Int. Cl.
*A47J 36/24* (2006.01)
*A47J 36/32* (2006.01)

(52) U.S. Cl.
CPC .............. *A47J 36/2405* (2013.01); *A47J 36/32* (2013.01)

(58) Field of Classification Search
CPC ............................ A47J 36/2405; A47J 36/32
USPC ........ 99/342, 343, 344, 330; 374/29–39, 141, 374/149
See application file for complete search history.

(56) References Cited

U.S. PATENT DOCUMENTS

| | | | | |
|---|---|---|---|---|
| 3,270,661 | A | * | 9/1966 | Juvan ............................... 99/343 |
| D214,165 | S | * | 5/1969 | Sesholtz ...................... D23/316 |
| 3,701,313 | A | * | 10/1972 | Boggs ............................. 99/330 |
| 4,047,476 | A | | 9/1977 | Liebermann |
| 4,555,358 | A | | 11/1985 | Matsushita et al. |
| 4,623,544 | A | | 11/1986 | Highnote |
| 4,660,542 | A | | 4/1987 | Scherer |
| 5,097,759 | A | | 3/1992 | Vilgrain et al. |
| 5,101,714 | A | | 4/1992 | Grandi |
| 5,123,337 | A | | 6/1992 | Vilgrain et al. |
| 5,280,748 | A | | 1/1994 | Pardo |
| 5,281,426 | A | | 1/1994 | Pardo |
| 5,445,062 | A | | 8/1995 | Polster |

(Continued)

FOREIGN PATENT DOCUMENTS

DE          19519809        * 12/1996
JP           04072112        * 3/1992

*Primary Examiner* — Dana Ross
*Assistant Examiner* — Frederick Calvetti
(74) *Attorney, Agent, or Firm* — Jeffrey Schox; Diana Lin (57) ABSTRACT

One variation of an apparatus for cooking includes: a housing including a first section configured to be immersed in fluid within a cooking container and a second section adjoining the first section; an annular knob arranged over the second section; a position sensor arranged within the second section and configured to detect rotation of the magnetic element; a display arranged on the housing and configured to display a cooking parameter selected through rotation of the annular knob; a heating element arranged within the first section; a circulator arranged within the housing and configured to draw fluid, in the cooking container, along the heating element; and a controller configured to control the heating element and the circulator according to a temperature of the fluid measured by the temperature sensor, thereby maintaining the fluid within a predetermined range of temperatures including the selected temperature.

27 Claims, 6 Drawing Sheets

(56) References Cited

U.S. PATENT DOCUMENTS

| | | |
|---|---|---|
| 5,539,185 A | 7/1996 | Polster |
| 5,540,215 A | 7/1996 | Fritzsche et al. |
| 5,542,344 A | 8/1996 | Koether et al. |
| 5,570,626 A | 11/1996 | Vos |
| 5,590,587 A | 1/1997 | Polster |
| 5,613,423 A | 3/1997 | Polster |
| 5,665,434 A | 9/1997 | Mass et al. |
| 5,701,804 A | 12/1997 | Liebermann |
| 5,722,289 A * | 3/1998 | Carr ................. 73/302 |
| 5,767,487 A | 6/1998 | Tippmann |
| 5,916,617 A | 6/1999 | Polster |
| 5,983,783 A * | 11/1999 | Archard et al. ........... 99/342 |
| 6,038,865 A | 3/2000 | Watanabe et al. |
| 6,056,985 A | 5/2000 | Fluckiger et al. |
| 6,079,486 A | 6/2000 | Cennamo et al. |
| 6,360,652 B1 | 3/2002 | Cusenza et al. |
| 6,455,085 B1 | 9/2002 | Duta |
| 6,565,330 B1 | 5/2003 | Bresolin |
| 6,582,743 B2 * | 6/2003 | Cai ....................... 426/510 |
| 6,582,745 B1 | 6/2003 | Northern |
| 6,849,830 B2 | 2/2005 | Damiano et al. |
| 6,892,628 B2 | 5/2005 | Northern |
| 6,931,204 B2 | 8/2005 | Urata et al. |
| 7,409,765 B2 * | 8/2008 | So ........................ 30/123 |
| 7,488,919 B2 | 2/2009 | Gagas et al. |
| 7,654,194 B2 | 2/2010 | Lagares Corominas |
| 7,757,601 B2 | 7/2010 | Lagares Corominas et al. |
| 8,047,128 B2 | 11/2011 | Salvaro |
| 2002/0018401 A1 * | 2/2002 | Vassallo ................... 368/11 |
| 2002/0073853 A1 * | 6/2002 | Norcross ................. 99/342 |
| 2002/0196838 A1 * | 12/2002 | Lee ....................... 374/155 |
| 2004/0074398 A1 * | 4/2004 | Griffin et al. ............. 99/342 |
| 2008/0023309 A1 * | 1/2008 | Montalvo ................ 200/332 |
| 2008/0066624 A1 * | 3/2008 | Taylor et al. ............. 99/330 |
| 2009/0087534 A1 * | 4/2009 | McLemore ............... 426/523 |
| 2010/0302757 A1 | 12/2010 | Bennett, Jr. |
| 2011/0018725 A1 * | 1/2011 | Yang et al. .............. 340/627 |
| 2011/0185915 A1 * | 8/2011 | Eades et al. .............. 99/331 |
| 2011/0186283 A1 * | 8/2011 | Preston .................. 165/287 |

* cited by examiner

APPARATUS AND SYSTEM FOR LOW-TEMPERATURE COOKING

CROSS-REFERENCE TO RELATED APPLICATIONS

This application claims the benefit of U.S. Provisional Patent Application No. 61/605,160, filed on 29, Feb. 2012, which is incorporated herein in its entirety by this reference.

TECHNICAL FIELD

This invention relates generally to the field of low-temperature cooking, and more specifically to a new and useful apparatus for low-temperature cooking in the field of low-temperature cooking.

BACKGROUND

Sous-vide and other types of low-temperature cooking are becoming well-recognized forms of cooking due to the high-quality product they often produce. However, low-temperature cooking requires specialized cooking systems that are typically large, expensive, and/or fail to be accessible to residential kitchens. Therefore, there is a need in the field of low-temperature cooking for a new and useful apparatus for low-temperature cooking. This invention provides such a new and useful apparatus.

DESCRIPTION OF THE PREFERRED EMBODIMENTS

The following description of preferred embodiments of the invention is not intended to limit the invention to these preferred embodiments, but rather to enable any person skilled in the art to make and use this invention.

Figure 1:
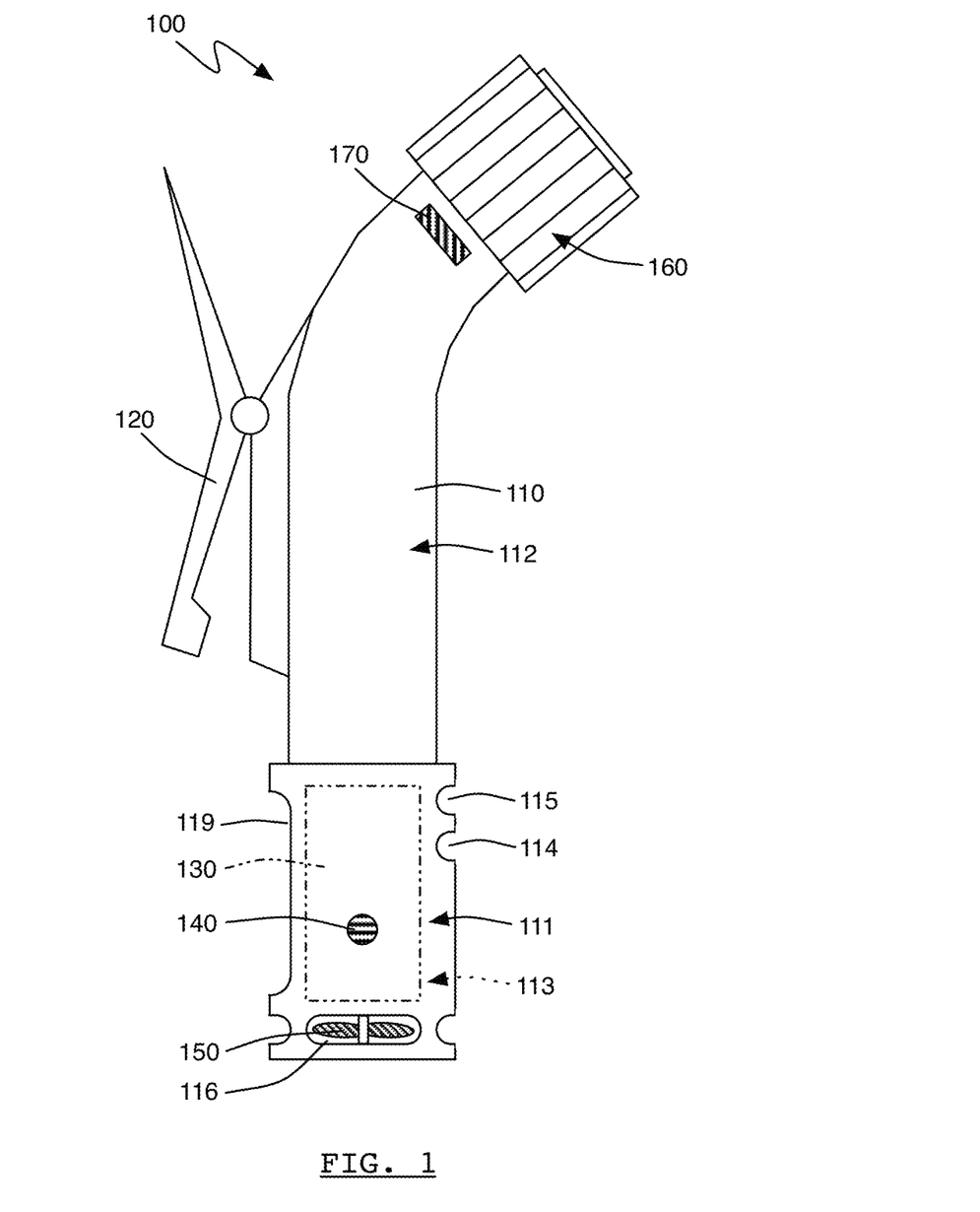
FIG. 1 is a schematic representation of an apparatus of an embodiment.

As shown in FIG. 1, an apparatus 100 for cooking includes: a housing including a first section 111 configured to be immersed in fluid within a cooking container and a second section 112 adjoining the first section in, the first section 111 defining an elongated fluid inlet 119 adjacent a cavity 113; a clip 120 arranged on the housing 110 and configured to support the housing no on a wall of the cooking container with the elongated fluid inlet 119 substantially adjacent a substantially vertical section of the wall of the cooking container; a heating element 130 arranged within the cavity; a temperature sensor 140 coupled to the housing 110; a circulator 150 configured to draw fluid, in the cooking container, into the elongated fluid inlet 119, along the heating element 130, and out of the cavity 113 through a fluid outlet 116 arranged on a distal end of the first section 111 opposite the second section 112; an input region 160 arranged on the second section 112 of the housing 110 and configured to receive a selected temperature; and a controller 170 configured to control the heating element 130 and the circulator 150 according to a temperature of the fluid measured by the temperature sensor 140, thereby maintaining the fluid within a predetermined range of temperatures including the selected temperature.

Figure 2A:
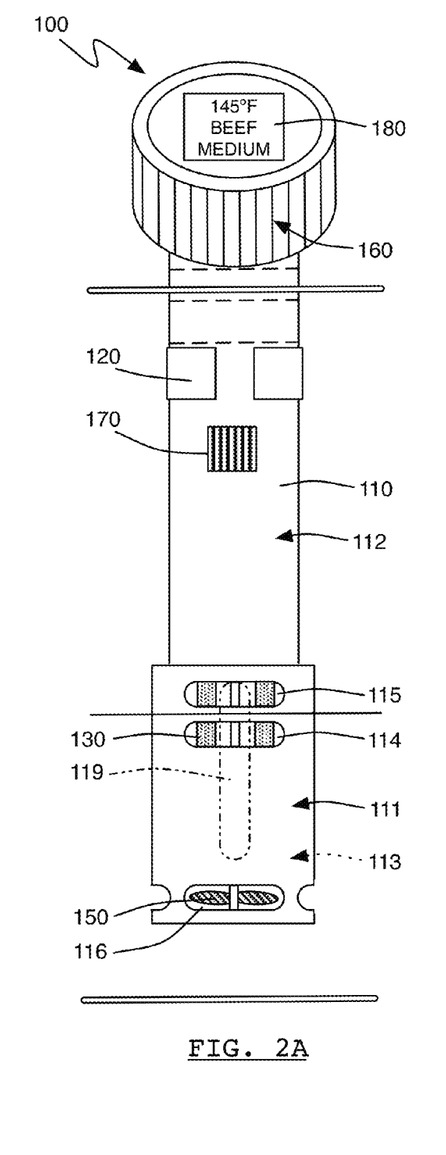
FIGS. 2A and 2B are schematic representations of variations of the apparatus.
Figure 2B:
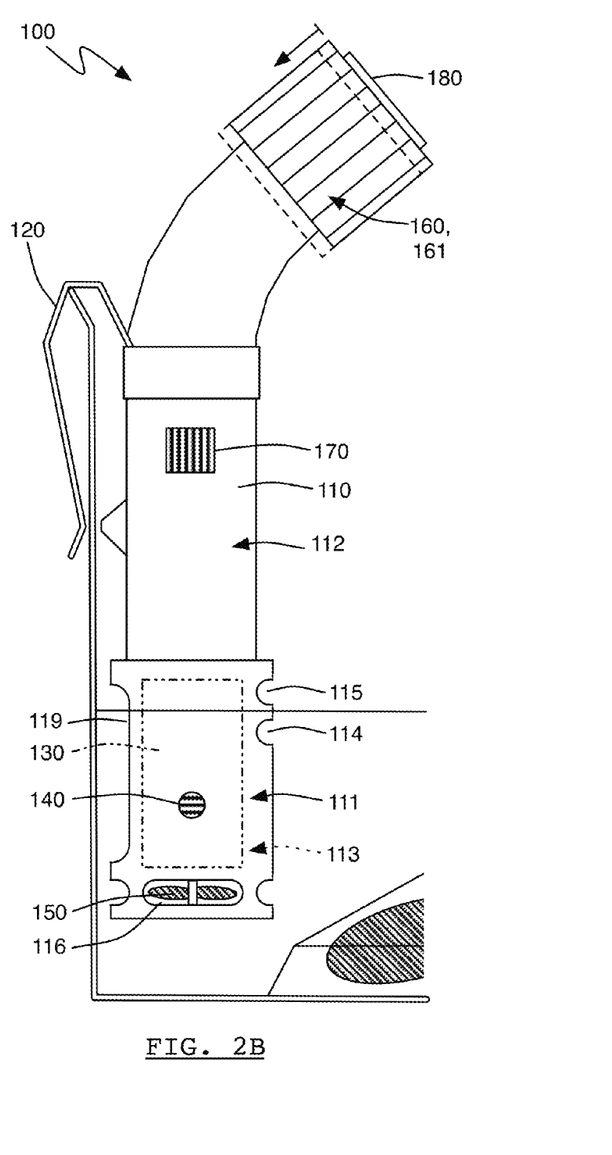
Figure 5:
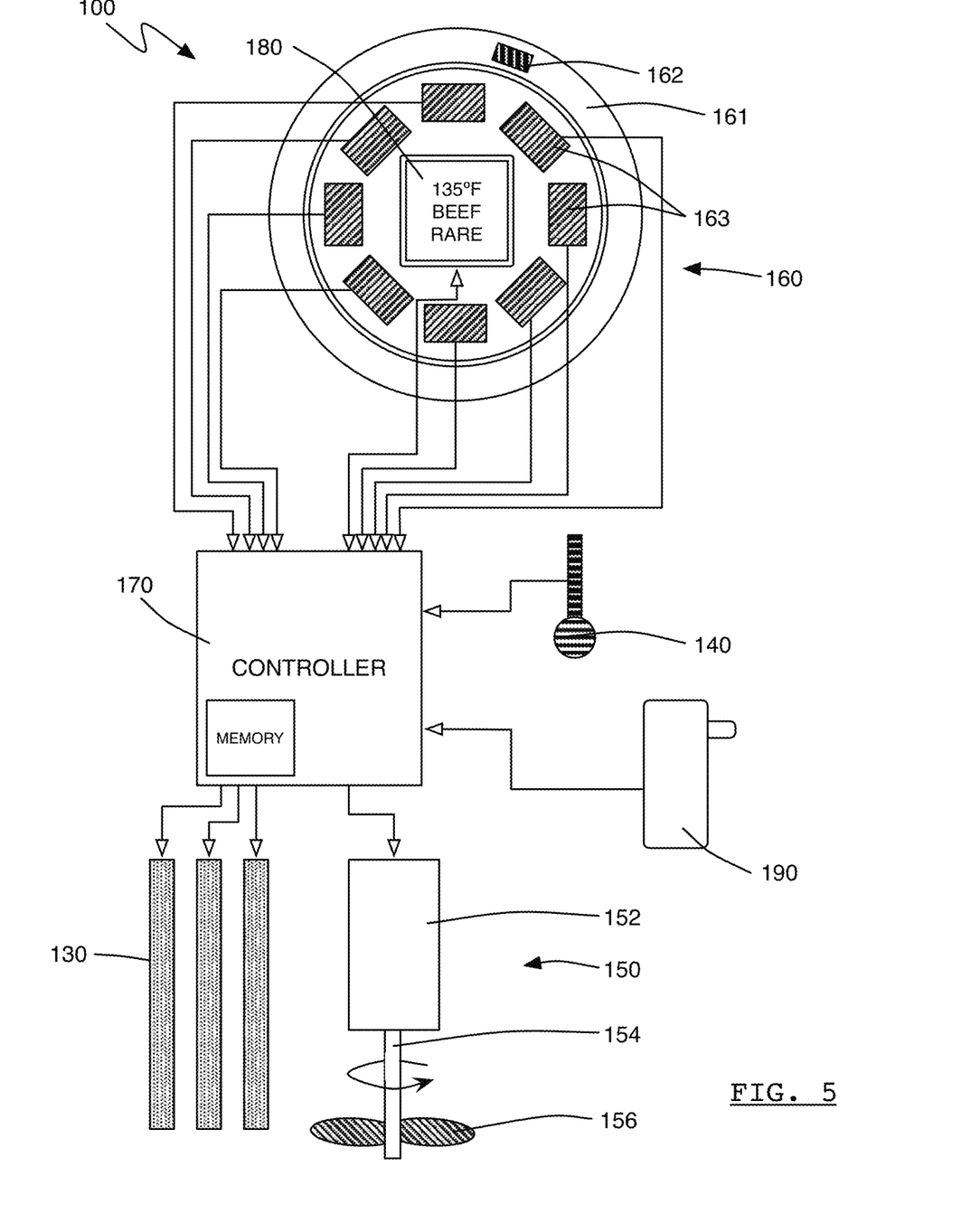
FIG. 5 is a schematic representation of a variation of the apparatus.

As shown in FIGS. 2B and 5, one variation of the apparatus 100 for cooking includes: a housing no including a first section 111 configured to be immersed in fluid within a cooking container and a second section 112 adjoining the first section 111, the first section 111 defining a fluid inlet 119 adjacent a cavity 113; an annular knob 161 arranged over the second section 112; a position sensor 163 arranged within the second section 112 and configured to detect rotation of the annular knob 161; a display 180 arranged on the housing 110 substantially concentric with the annular knob 161 and configured to display a cooking parameter selected through rotation of the annular knob 161; a heating element 140 arranged within the first section 111; a circulator 150 arranged within the housing 110 and configured to draw fluid, in the cooking container, into the fluid inlet 119, along the heating element 130, and out of the cavity 113 through a fluid outlet 116; and a controller 170 configured to control the heating element 130 and the circulator 150 according to a temperature of the fluid measured by the temperature sensor, 140 thereby maintaining the fluid within a predetermined range of temperatures including the selected temperature.

Figure 3:
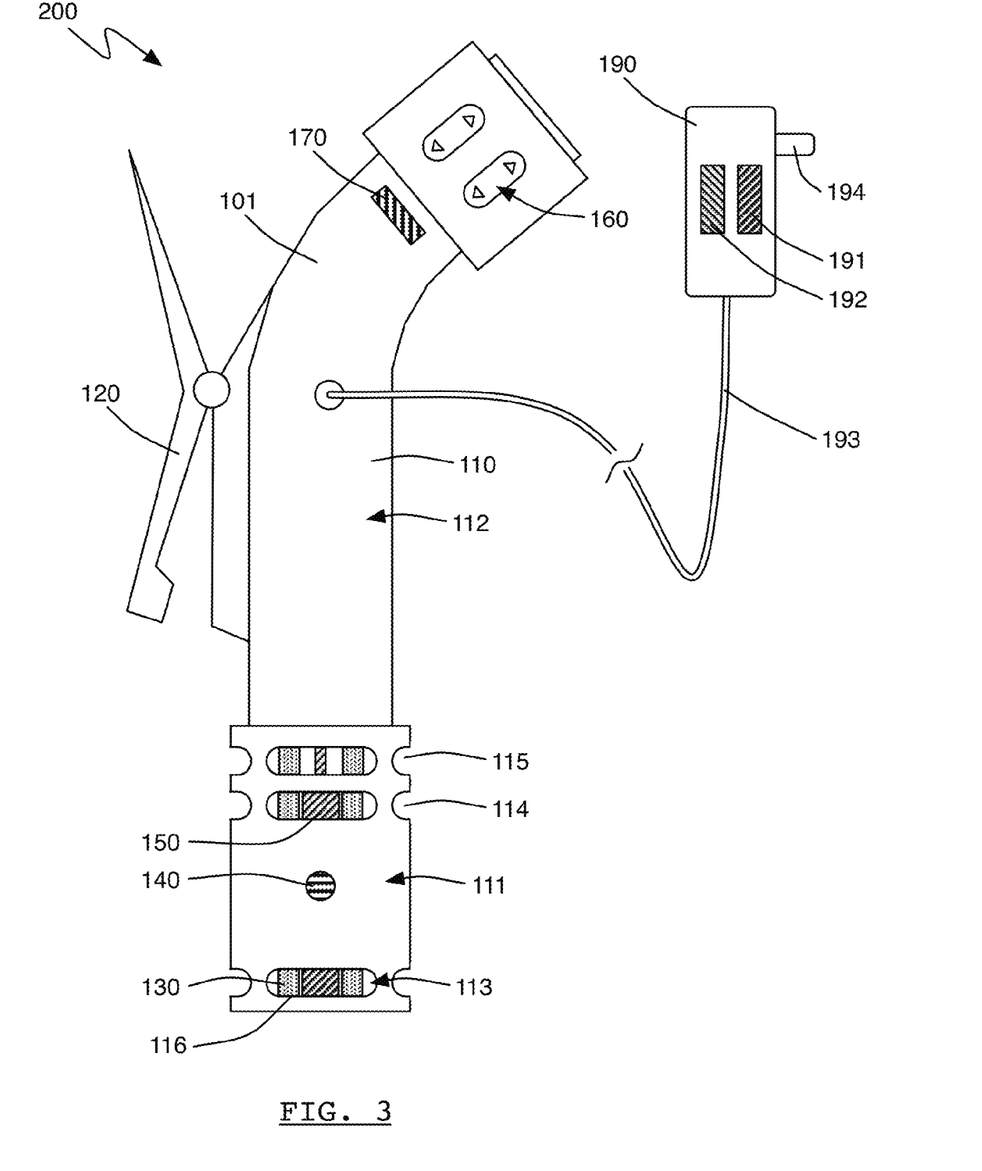
FIG. 3 is a schematic representation of a variation of the apparatus.
Figure 6:
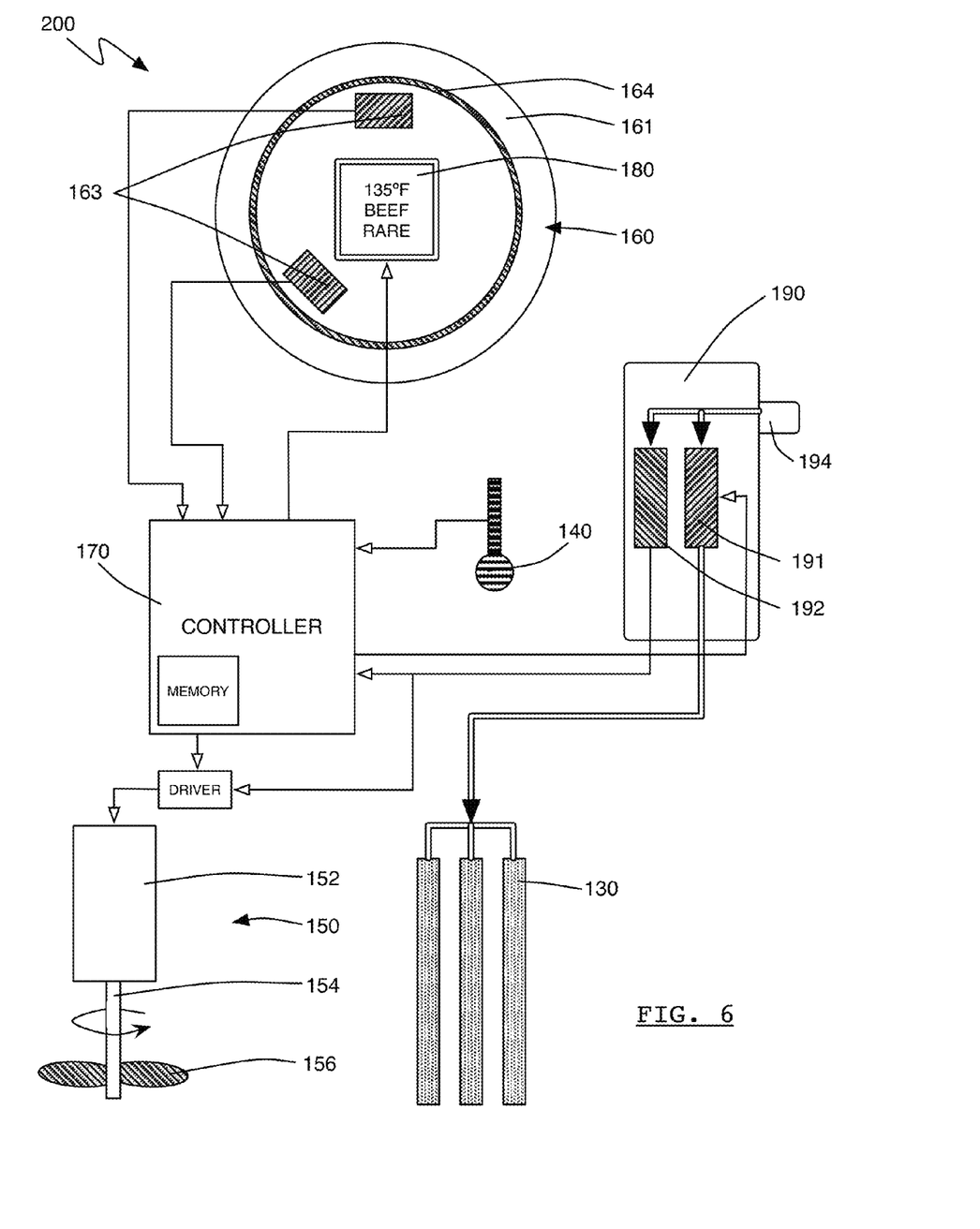
FIG. 6 is a schematic representation of a variation of the apparatus.

As shown in FIGS. 3 and 6, another variation of the apparatus 100 includes a system 200 for cooking, including: a power adapter 190 including a plug 194 configured to engage an electrical wall outlet 116 and a rectifier 192 and a relay 191 electrically coupled to the plug 194; and an immersion apparatus 101 electrically coupled to the power adapter 190 and including a housing 110 including a first section 111 configured to be immersed in fluid within a cooking container and a second section 112 adjoining the first section 111, the first section 111 defining a fluid inlet 119 and a fluid outlet 116 fluidly coupled to a cavity 113, a clip arranged on the housing 110 and configured to support the housing 110 on a wall of the cooking container, a heating element 130 arranged within the cavity 113, a temperature sensor 140 coupled to the housing 110, a circulator 150 arranged within the housing 110 and configured to draw fluid, in the cooking container, into the fluid inlet 119, along the heating element 130, and out of the cavity 113 through a fluid outlet 116, an input region 160 arranged on the second section 112 of the housing 110 and configured to receive a selected temperature, and a controller 170 configured to receive power from the rectifier 192, to control the circulator 150, and to transmit a digital signal to the relay 191 to control the heating element 130 according to a temperature of the fluid measured by the temperature sensor 140, thereby maintaining the fluid within a predetermined range of temperatures including the selected temperature.

The apparatus 100 enables low-temperature cooking, such as sous-vide, wherein a cooking fluid is heated and circulated around a food product contained in a sealed pouch. For example, the apparatus 100 can heat water in a standard six-quart cooking pot to a temperature between 134 and 183 degrees Fahrenheit and circulate the water around a resealable plastic bag containing meat or vegetables. Generally, the apparatus 100 can be placed in a cooking container (i.e. pot or pan) with the first section 111 of the housing 110 immersed in cooking fluid, the clip 120 supporting the housing 110 against the cooking container. The apparatus 100 can then create an effective cooking environment by heating and circulating fluid around a pouch containing food and immersed in the fluid. Because the apparatus 100 defines an immersible housing containing heating and circulating systems, the apparatus 100 can be substantially container agnostic such that that the apparatus 100 can be used on any suitable pot or other cooking container. For example, the apparatus 100 can be immersed in a small pot to cook a single eight-ounce filet mignon at one time and later immersed in a larger pot to cook a twelve-pound roast. The controller 170 can also be configured to set time and temperature cooking parameters, such as for a particular type of food and/or a particular size or weight of food, thus further enabling the apparatus 100 to cook foods of various types and sizes by heating fluid in a cooking container to particular temperatures and for a particular periods of time according to selected parameters.

In variations of the apparatus 100, the fluid inlet 119 defines an elongated opening along the first section 111 adjacent the cavity. The arrangement of the clip 120 substantially in line with the fluid inlet places the fluid inlet substantially adjacent to (and slightly offset from) a vertical wall of the cooking container when the apparatus 100 is arranged on the cooking container via the clip 120. This orientation and geometry of the fluid inlet and the clip 120 may thus substantially prevent the sealed pouch (e.g., resealable plastic bag) from being drawn toward and obstructing the fluid inlet since the wall of the cooking container and the housing 110 of the apparatus 100 may not enable the pouch to move near enough the fluid inlet to be drawn into the fluid inlet or to be drawn around both sides of the housing 110 to block the fluid inlet. However, in the event that the bag does block the inlet, the controller 170 can monitor the circulator 150 to identify and handle a blockage. For example, the controller 170 can monitor a back EMF or current draw of a motor 152 in the circulator 150, correlate a back EMF or current draw of the motor 152 above a predefined threshold as a blockage of the fluid inlet 119 or fluid outlet 116, and cut power to the circulator 150, thereby reducing the likelihood of unevenly cooked food or damage to the apparatus 100 in the event of cavity blockage.

In variations of the apparatus 100, the input region of the apparatus 100 includes an annular knob arranged on the second section 112 of the housing 110 and a contactless position sensor that detects rotation of the annular knob. In this variation, the housing no can define a sealed (e.g., waterproof up to one meter) internal chamber that houses moisture-sensitive components, such as the controller 170, the position sensor, and a motor of the circulator 150. In this configuration, the annular knob can be wholly outside of the sealed chamber and the moisture-sensitive position sensor within the chamber such that the apparatus 100 can be immersed in fluid without sustaining substantial damage. Furthermore, in variations of the apparatus 100, the apparatus 100 can further include a power adapter 190 that houses power electronics required to operate the heating element 130 such that moisture-sensitive relays, drivers, electronics, etc. that generate heat themselves can be arranged outside of the housing 110 and away from the cooking container. This can remove heating-producing components from the housing 110, thus enabling the housing no to contain core components including the controller 170, the input region or position sensor, and a motor of the circulator 150 in a sealed internal chamber without necessitating air flow to cool the internal chamber. The internal chamber can therefore be sealed, thus reducing risk to a user (e.g., electrical shock) and to the apparatus 100 if the apparatus 100 is fully immersed in fluid. The power adapter 190, which is configured to be plugged into an electrical wall outlet 116, can be substantially removed from the cooking container while the apparatus 100 is in use, need not necessarily be sealed, and therefore can include air inlets or an other heat path to cool internal power components.

As shown in FIGS. 2A and 2B, the housing no of the apparatus 100 includes a housing including a first section configured to be immersed in fluid within a cooking container and a second section adjoining the first section in, the first section 111 defining an elongated fluid inlet 119 adjacent a cavity. The first section 111 can further define a cavity 113, a first fluid inlet 114, a second fluid inlet 115, and a fluid outlet 116. Generally, the housing 110 functions to define an immersible vessel that contains and/or supports various components of the apparatus 100, including the heating element 130, the temperature sensor 140, the circulator 150, the input region 160, knob 161 and/or position sensor 163, the controller 170, the display 180, the clip 120, etc. The housing no can therefore be substantially waterproof such that fluid in the cooking container (e.g., water) cannot leak into the housing 110 when the first section 111 is immersed in the fluid. For example, the first and second sections 111, 112 of the housing 110 can cooperate to define an internal chamber with a second ingress protection rating of at least 4, wherein the controller 170 and/or other moisture-sensitive components of the apparatus 100 are arranged within the internal chamber. The controller 170, which can be a processor, integrated circuit, or other electrical circuitry, can therefore be protected from fluid ingress that could be hazardous to a user and damaging to the apparatus 100. The housing 110 can also be dustproof, shockproof, or otherwise protected from damage from impact or foreign substances. However, the housing no can define any other suitable substance barrier and/or impact barrier for any one or more components of the apparatus 100.

The housing 110 can also be of a material that is substantially food-safe and/or that does not degrade in the presence of typical cooking fluids (e.g., water) at typical low-temperature cooking temperatures (e.g., 134-183° F.). For example, the housing 110 can be a polymer housing, such as injection molded polyethylene terephthalate (PET) or high-density polyethylene (HDPE). Alternatively, the housing 110 can be metal, such as spun or drawn 18/10 stainless steel or cast aluminum. However, the housing no can be of any other suitable material.

In one implementation, the housing 110 includes the first section in and the second section 112 that each define a substantially circular cross-section, wherein the first and second sections 111, 112 share a common axis, as shown in FIG. 2A. In this implementation, the first section 111 can define a substantially linear central axis, and the second section 112 can define a substantially curved central axis, as shown in FIGS. 1 and 2B. Alternatively, the housing 110 can define the first and second sections that are square (shown in FIG. 4B), rectangular, elliptical, polygonal, or amoebic in cross-section or of any other suitable cross-section. The housing 110 can also define any other suitable swept geometry or central axis geometry across the first and/or second sections 111, 112. However, the housing no can be of any other suitable form.

The first section 111 of the housing 110 also defines the cavity 113, the elongated fluid inlet 119, and the fluid outlet 116. The cavity 113 is thermally coupled to the heating element 130, contains the heating element 130, and/or contains a heatsink coupled to the heating element 130. As described above, the housing no defines the elongated fluid inlet 119 substantially in line with the clip 120 such that the elongated fluid inlet 119 is substantially adjacent a vertical wall of the cooking container when the apparatus 100 is attached to the cooking container via the clip 120. The housing 110 can define the cavity that is also elongated such that the elongated fluid inlet 119 defines a fluid inlet along a portion or all of a length of the cavity. In one implementation, the base of the elongated fluid inlet 119 can define a minimum fluid level in the cooking container and/or the top of the elongated fluid inlet 119 can define a maximum fluid level in the cooking container. In this implementation, the elongated fluid inlet 119 can thus enable displacement of fluid through the cavity as various fluid depths within the cooking container. For example, the circulator 150 can include an impeller 156 and a motor 152, wherein the motor 152 rotates the impeller 156 to draw fluid through the elongated fluid inlet 119, into the cavity, and along a first length of the heating element 130 at a first fluid level within the cooking container. The motor 152 can also rotate the impeller 156 to draw fluid through the elongated fluid inlet 119, into the cavity, and along a second length of the heating element 130 greater than the first length at a second fluid level within the cooking container greater than the first fluid level.

The housing 110 can additionally or alternatively define a first fluid inlet 114 and a second fluid inlet 115. In one implementation, the first inlet 114 is arranged at a first distance from the first section 111 and enables fluid to enter the cavity 113 when fluid in the cooking container is at a first level, as shown in FIGS. 2A and 2B. The second inlet 115 is arranged at a second distance from the first section 111 less than the first distance, and the second inlet 115 cooperates with the first inlet 114 to enable fluid to enter the cavity 113 when fluid in the cooking container is at a second level greater than the first level. Therefore, the first inlet 114 allows fluid to enter the cavity 113 when the fluid level in the container is relatively low, and the second inlet 115 allows fluid to enter the cavity 113 when the fluid level in the container is relatively high, which can thus enable the apparatus 100 to maintain the temperature of various volumes of fluid in cooking containers of various sizes. The housing 110 can also define both the elongated fluid inlet 119 and the first and second fluid inlets. In this implementation, the first and second fluid inlets can be arranged on the first section 111 of the housing 110 substantially opposite elongated fluid inlet 119, thus defining a visual cue of upper and lower fluid level limits in the cooking container (since the elongated fluid inlet 119 may be visually obstructed due to its proximity to the vertical wall of the cooking container).

The housing 110 can define the fluid outlet 116 proximal a distal end of the first section 111 (i.e. adjacent the cavity 113 opposite the second section), which can thus enable fluid to enter the cavity through the elongated or other fluid inlet, travel downward along the heating element 130, and exit the cavity 113 proximal the bottom of the cooking container. However, the housing no can define the fluid outlet 116 arranged in any other way on the first section 111.

The elongated fluid inlet 119, the first fluid inlet 114, the second fluid inlet 114, 115, and/or the fluid outlet 116 can be circular, rectangular, elliptical, slotted, or of any other suitable cross-section. The first section 111 can also define additional fluid inlets, such as a third inlet and a fourth inlet arranged serially with the first and second inlets 114, 115 along the first section 111.

In another implementation, the first section 111 defines a fluid inlet proximal the distal end of the first section 111 adjacent the cavity 113 opposite the outlet 116 such that the circulator 150 draws fluid from the distal end of the first section 111, through the cavity 113, and out the fluid outlet 116 proximal the second section 112. In yet another implementation, the first section 111 defines the cavity 113 that is substantially enclosed on three sides, wherein a slot along the cavity 113 defines a fluid inlet physically coextensive with a fluid outlet 116. However, the housing 110 can define the elongated fluid inlet 119, the first and second (and additional) fluid inlets 114, 115, the fluid outlet 116, and/or the cavity 113 in any other suitable way.

As shown in FIG. 2B, the clip 120 of the apparatus 100 is arranged on the housing 110 and is configured to support the housing no on a wall of the cooking container with the elongated fluid inlet 119 substantially adjacent a substantially vertical section of the wall of the cooking container. Generally, the clip 120 functions fasten, clamp, or otherwise engage a feature of the cooking container such that the apparatus 100 is supported within the cooking container during use. Therefore, the clip 120 can prevent instances in which the apparatus 100 is only loosely placed within the cooking container or can fall into the container. In one implementation, the clip 120 is configured to extend over a vertical wall (e.g., rim) of the cooking container to support the housing 110 vertically within the cooking container, as shown in FIG. 2B. For example, the clip 120 can define a clamp including an elongated member and a spring, the elongated member configured to extend over a vertical wall of the cooking container, pivotably coupled to the housing no, and sprung against the housing 110 by the spring, as shown in FIG. 1. In this example, the clip 120 can be configured to extend over and to clamp onto a vertical wall of the cooking container to support the housing 110 both vertically and laterally. Alternatively, the clip 120 can engage a handle on the cooking container or a feature inside the cooking container, such as a ledge, rim, shelf, or slot within the cooking container. For example, as shown in FIG. 2B, the clip 120 can include a bent stainless steel clip configured to loop over a rim of the cooking container. In another example, the clip 120 can include a bent stainless steel clip configured to engage a slot in a stainless steel tab attached to an interior wall of the cooking container.

In another implementation, the clip 120 can include one or more suction cups configured to couple the housing 110 to a bottom surface or interior wall of the cooking container. The clip 120 can similarly include suction cups configured to couple the housing 110 to a lid of the cooking container. However, the clip 120 can function in any other way to support the housing 110 on or within the cooking container. Furthermore, the apparatus 100 can omit the clip 120 altogether and instead be configured for loose arrangement within the cooking container during use. Alternatively, the apparatus 100 can include a set (e.g., three) legs or other support features configured to orient the housing no in a substantially static position within the container during use, such as against a wall or a bottom of the container. However, the apparatus 100 can include the clip 120, legs, and/or other support feature to support the housing 110 on or within the cooking container in any other suitable way during use.

The heating element 130 of the apparatus 100 is arranged within the first section in of the housing 110. The heating element 130 is arranged within the cavity 113 and/or is thermally coupled to the cavity 113 such that the heating element 130 can communicate thermal energy into fluid drawn into the cavity 113, such as while the circulator 150 displaces fluid from the fluid container through the elongated fluid inlet 119 (and/or the first and/or second fluid inlets), through the cavity 113, and back into the container via the fluid outlet 116.

Generally, the heating element 130 functions to output thermal energy to heat the fluid. In one implementation, the heating element 130 transforms electrical energy sourced from a wall outlet 116 (e.g., a standard residential 120 VAC wall outlet 116) into thermal energy. For example, the heating element 130 can include one or more positive temperature coefficient ceramic heating elements. Alternatively, the heating element 130 can include resistance wire, a heater cartridge, a heat pump, a Peltier device, or any other suitable type of electric heating element.

In another implementation, the heating element 130 transforms chemical energy, such as natural gas, butane, methane, hydrogen, or other combustible gas, into thermal energy. For example, the heating element 130 can include a burner that ignites natural gas sourced from a residential gas line and communicates heat from combustion of the gas into the fluid in the cooking container. However, the heating element 130 can function in any other way to transform electrical, chemical, or other energy into thermal energy to heat fluid in the container.

Figure 4A:
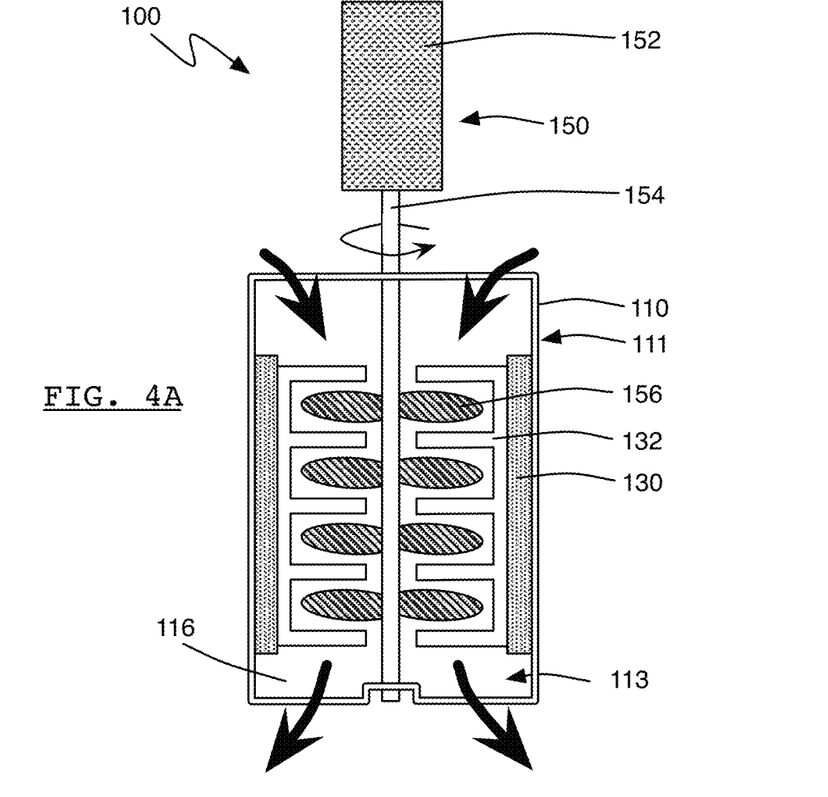
FIGS. 4A and 4B are schematic representations of variations of the apparatus.
Figure 4B:
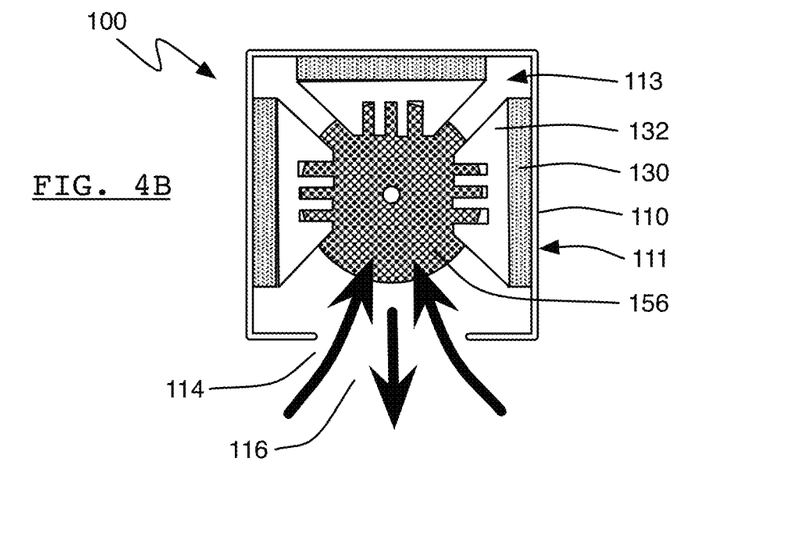

The heating element 130 can be all or partially arranged within the cavity 113. As shown in FIGS. 4A and 4B, the heating element 130 can also be arranged in a geometric pattern with additional heating elements within or partially within the cavity 113. For example, the apparatus 100 can include a set of three positive temperature coefficient ceramic heating elements spaced regularly (i.e. at 120° spacing) about the cavity 113 that is circular in cross-section. Similarly, as shown in FIGS. 4A and 4B, the apparatus 100 can include a set of three positive temperature coefficient ceramic heating elements arranged on three of four walls of the cavity 113 that is square in cross-section, the first section 111 defining the elongated fluid inlet 119 along the fourth wall. Alternatively, the heating element 130 can be arranged outside of the cavity 113. For example, in this implementation, thermal energy can be communicated from the heating element 130 to the fluid via a heatsink. However, the heating element 130 can be any other type of heating element arranged in any suitable way within the apparatus 100 to heat the fluid within the container.

As shown in FIGS. 4A and 4B, one variation of the apparatus 100 includes a heatsink coupled to the heating element 130 and including a set of (i.e. one or more) fins extending into the cavity 113. Generally, the heatsink 132 functions to communicate heat from the heating element 130 into the fluid by establishing a relatively low thermal resistance (e.g., relatively high surface area, relatively high thermal conductivity) heat path between the heating element 130 and fluid within the cavity 113. In one example implementation shown in FIGS. 4A and 4B, the heat sink is a finned aluminum heatsink affixed to the heating element 130 and arranged within the cavity 113, wherein the circulator 150 draws fluid into the cavity 113 and around the heatsink 132. For example, the heatsink 132 can include elongated fins spaced substantially evenly around the heating element 130 that is cylindrical and centered within the cavity 113 that is cylindrical. In another example, the apparatus 100 includes three heating elements arranged on each of three walls that define the cavity 113, each heating element thermally coupled to a discrete rectilinear heatsink including fins extending toward the axis (or center) of the cavity 113, as shown in FIGS. 4A and 4B. In yet another example, the heating element 130 can be arranged outside of the cavity 113, such as in the second section 112 of the housing 110, and the heatsink 132 can extend from the heating element 130 into the cavity 113 to transfer thermal energy from the heating element 130 into fluid within the cavity 113. In a further example, each fin, in the set of fins of the heatsink 132, extends linearly along a portion of the length of the cavity, and the heating element 130 defines an elongated heating element substantially encased within the heatsink 132. In this example, the heating element 130 can be substantially sealed within the heatsink 132, such as with potting, to substantially prevent contamination of the cooking fluid by the heating element 130 that is not a food-safe material. However, the heatsink 132 can be any other material coupled to the heating element 130 in any other way and arranged in any other way within the apparatus 100.

The temperature sensor 140 of the apparatus 100 generally functions to measure a temperature of fluid within the container. Because fluid is drawn into at least one fluid inlet, along a heating element within the cavity 113, and out through the fluid outlet 116, a temperature gradient may exist across a volume of fluid between the inlet and the outlet 116 at any instant in time. Furthermore, the temperature of fluid entering the fluid inlet may be more representative of the overall (e.g., average) temperature of fluid within the container. Therefore, the temperature sensor 140 can be arranged within the cavity 113 adjacent the base of the elongation fluid inlet. Similarly, the temperature sensor 140 can be arranged on an exterior surface of the first section 111 of the housing 110 proximal the first fluid inlet 114. Alternatively, the temperature sensor 140 can be arranged in any other location on the exterior surface of the first section 111 of the housing 110, such as between the first fluid inlet 114 and the fluid outlet 116 (shown in FIG. 1). However, the temperature sensor 140 can be arranged in any other location on or within the apparatus 100, such as adjacent the heating element 130, within the cavity 113 and adjacent the fluid outlet 116, or on an exterior surface of the first section in of the housing no adjacent the fluid outlet 116.

In one variation, the apparatus 100 further includes a second temperature sensor. In this variation, the temperature sensor 140 and the second temperature sensor are spaced apart by some distance such that the controller 170 can analyze temperature readings from the temperature sensor 140 and the second temperature sensor to estimate a rate of heat transfer into the fluid and/or to determine a temperature gradient in a portion of the fluid in the container and/or in the cavity 113. In one example implementation, the temperature sensor 140 is arranged proximal the first fluid inlet 114 and the second temperature sensor is arranged proximal the fluid outlet 116, wherein the controller 170 estimates a rate of heat transfer into the fluid based on a known volume of the cavity 113 between the first fluid inlet 114 and the fluid outlet 116 and a temperature difference between temperature readings at the temperature sensor 140 and at the second temperature sensor. In this example implementation, the controller 170 can calibrate the temperature sensor 140 and the second temperature sensor by comparing temperature readings from both prior to powering the heating element 130 (i.e. when the temperature of fluid in the container is substantially even throughout) and then adjusting a sensor-signal-to-temperature conversion algorithm for each temperature sensor such that the temperature readings for the temperature sensor 140 and the second temperature sensor substantially match prior to heating the fluid. For example, this can reduce measurement errors due to manufacturing inconsistencies in the temperature sensors or manufacturing inconsistencies in components incorporated in signal conditioning circuits for the temperature sensors. Similarly, the temperature sensor 140 can be arranged proximal the bottom of the elongated fluid inlet 119 and the second temperature sensor can be arranged proximal the top of the elongated fluid inlet 119.

In one implementation, the temperature sensor 140 includes a thermistor. The second temperature sensor can also include a thermistor. Alternatively, the temperature sensor 140 (and second temperature sensor) can include a resistance thermometer, a silicon bandgap temperature sensor, a quartz thermometer, or any other suitable type of temperature sensor or temperature sensing element.

The apparatus 100 can also include a heating element temperature sensor arranged on or in thermal communication with the heating element 130. The controller 170 can receive a signal from the heating element 130 temperature sensor to determine the temperature of the heating element 130 and cut of power to the heating element 130 given a measured temperature that exceeds a threshold maximum temperature, such as 250° F.

The circulator 150 of the apparatus 100 is configured to draw fluid, in the cooking container, into the elongated fluid inlet 119, along the heating element 130, and out of the cavity through a fluid outlet 116 arranged on a distal end of the first section 111 opposite the second section 112. The circulator 150 can be similarly arranged within the housing 110 and configured to draw fluid, in the cooking container, into the fluid inlet, along the heating element 130, and out of the cavity through a fluid outlet 116. Generally, the circulator 150 functions to circulate fluid in the cooking container along the heating element 130 to distribute heat substantially evenly throughout the fluid in the cooking container. The arrangement of the elongated first fluid inlet along the first section 111 can enable the circulator 150 to draw fluid into the cavity 113 at various fluid levels in various types of containers.

Additionally or alternatively, the arrangement of the first fluid inlet 114 at a first distance from the fluid outlet 116 and the second fluid inlet 115 at a second distance from the fluid outlet 116 greater than the first distance (shown in FIG. 1) can enable the circulator 150 to draw fluid into the cavity 113 (and thus along the heating element 130) at various fluid levels in various types of containers. (The first fluid inlet 114 can also be described as being arranged at a first distance from the second section 112, and the second fluid inlet 115 can be described as being arranged at a second distance from the second section 112 less than the first distance.) For example, in a six-quart pot, the circulator 150 can draw fluid through the first inlet 114 when the total volume in the pot, including the fluid and the cooking pouch and its contents, is between two and three quarts. When the total volume in the pot is between three and four quarts, the circulator 150 can draw fluid through the first inlet 114 and the second inlet 115. In variations of the apparatus 100, when the total volume in the pot is between four and five quarts, the circulator 150 can draw fluid through the first inlet 114, the second inlet 115, and a third inlet, and when the total volume in the pot is between five and six quarts, the circulator 150 can draw fluid through the first inlet 114, the second inlet 115, the third inlet, and a fourth inlet. However, the fluid inlets can be arranged in any other way, and the circulator 150 can draw fluid into the cavity 113 via any one or more fluid inlets according to any other schedule or container volume.

In one implementation, the circulator 150 includes a rotary electric motor 152 coupled to an impeller 156 via a driveshaft 154, as shown in FIGS. 4A and 5. In this implementation, the rotary electric motor 152 can be arranged within the second section 112, and the impeller 156 can be arranged within the cavity 113 adjacent the base of the elongated fluid inlet 119 and/or adjacent the bottom of the heating element 130. The rotary electric motor 152 can therefore be isolated from the cavity 113 to prevent damage from moisture or fluid ingress and to prevent contamination of the cooking fluid, such as by lubricants. The driveshaft 154 can communicate torque from the motor 152 to the impeller 156, wherein the impeller 156, when in rotation, induces a pressure drop that causes fluid to flow through the cavity 113, as shown in FIGS. 4A and 4B. The driveshaft 154 can be supported by one or more bushings or bearings, such as on each side of and adjacent the impeller 156. The driveshaft can also be coupled to the motor 152 via a non-conductive (e.g., polymer) coupling to electrically isolate the driveshaft, which can substantially mitigate current leakage from the motor 152 into the cooking fluid via the driveshaft during use.

Furthermore, in the variation of the apparatus 100 that includes a heatsink, the impeller 156 can be arranged substantially adjacent the heatsink 132 to ensure fluid flow along one or more fins of the heatsink 132. For example, the heatsink 132 can define a set of (i.e. on or more) static vane stages, wherein the impeller 156 includes a set or driven vane stages adjacent and/or between the static vane stages such that the heatsink 132 and impeller can function as a compressor to move fluid through the cavity 113, such as shown in FIGS. 4A and 4B. The impeller 156 can be additionally or alternatively arranged adjacent the heating element 130, proximal the fluid outlet 116, or proximal the first fluid inlet 114. The impeller 156 can also include multiple sets of vanes, each set of vanes arranged proximal (e.g., slightly below) each fluid inlet. Furthermore, the motor 152 can be directly coupled to the impeller 156. The motor 152 can also be an immersion motor suitable for immersion in the cooking fluid such that the motor 152 can be arranged within the cavity 113. However, the impeller 156, motor 152, and/or driveshaft of the circulator 150 can be of any other type and arranged in any other way within the housing 110.

In the foregoing implementation, the rotary electric motor 152 can be rigidly mounted to the housing no or supported on soft isolators, such as rubber shock mounts or silicone o-rings. Furthermore, the rotary electric motor 152 can be an AC motor powered by an alternating (AC) electric current controlled via an analog relay or solid state relay. For example, the relay 191 can be controlled by the controller 170 to regulate power distribution to the rotary electric motor 152 from a standard residential 120 VAC wall outlet 116. Alternatively, the rotary electric motor 152 can be a DC motor powered by a direct (DC) electric current, also controlled via an analog relay or solid state relay (e.g., MOSFET, BJT, H-bridge). In one example, the apparatus 100 includes a rectifier and voltage regulator that convert alternating current from a standard residential 120 VAC wall outlet 116 into 12 VDC to power the motor 152 (and controller, input region, and/or display, etc.). In another example, the apparatus 100 includes a power adapter 190 for a wall outlet 116, the power adapter 190 including a rectifier and a voltage regulator that convert 120 VAC from the wall outlet 116 into a DC signal (e.g., 12 VDC) to power the motor 152 and other components within the apparatus 100 such that an alternating current signal remains substantially removed from the apparatus 100, the cooking container, and the fluid. However, the motor 152 can be any other suitable type of motor powered and controlled in any other suitable way.

In other implementations, the circulator 150 can include linearly- or rotationally-driven paddles, fans, vanes, etc. powered by an electric, pneumatic, hydraulic, or other suitable type of motor or actuator. However, the circulator 150 can include any other component of any other type and arranged in any other way within the apparatus 100. Alternatively, the apparatus 100 can exclude the circulator 150 and instead rely on convection to induce fluid flow along the heating element 130 (or heatsink) as thermal energy is conducted into fluid within the cavity 113.

The input region 160 of the apparatus 100 is arranged on the second section 112 of the housing 110 and is configured to receive a cooking parameter. Generally, the input region 160 functions to receive a user input pertaining to at least one of a desired cooking temperature, a desired cooking time, a desired cooking start time, a desired cooking end time, a type of food product to be cooked, a volume or weight of food product to be cooked, a desired cooking style (e.g., rare, medium, or well-done), or other cooking parameter. The selected temperature or other cooking parameter captured by the input region 160 can then be implemented by the controller 170 to set the cooking temperature, the total cooking time, the cooking start time, the cooking end time, etc. and/or to select a cooking temperature and cooking time based on the type, volume, and/or weight of food product to be cooked.

In one implementation, shown in FIGS. 2A and 2B, the second section 112 defines a substantially circular cross-section proximal a distal end of the second section 112 opposite the first section 111, the input region 160 including an annular knob 161 arranged over the circular cross-section of the second section 112 and a contactless position sensor.

In one example of the foregoing implementation shown in FIG. 5, the annular knob includes a magnetic element 162, and the position sensor includes a set of magnetic field sensors arranged on the second section 112 concentric with and inside the annular knob 161, the set of magnetic field sensors configured to sense rotation and/or an angular position of the magnetic element 162. The controller 170, electrically coupled to each magnetic field sensor in the set of magnetic field sensors, can correlate an angular position of the magnetic element 162 with cooking parameter selection. For example, each magnetic field sensor can include a Hall effect sensor, and the magnetic element 162 can include a rare earth magnet, wherein rotation of the annular knob 161 in a first direction is detected as a first sequence of output state changes of multiple magnetic field sensors, and wherein the controller 170 correlates the first sequence of output state changes as an increase in a selected temperature parameter. Similarly in this example, rotation of the annular knob 161 in an opposite direction is detected as a second sequence of output state changes of multiple magnetic field sensors, wherein the controller 170 correlates the second sequence of output state changes as a decrease in the selected temperature parameter. In this arrangement, the annular knob 161 can be arranged wholly outside of the housing 110 with all input sensing components (e.g., magnetic field sensors) arranged and sealed within the housing 110 such that moisture-sensitive components are protected against fluid ingress while enabling a user to conveniently enter, change, and/or select cooking parameters.

In another example of the foregoing implementation, shown in FIG. 6, the annular knob includes an optical encoder wheel, and the position sensor includes a set of optical sensors arranged on the second section 112 concentric with and inside the annular knob 161, the set of optical sensors configured to sense rotation and/or an angular position of the encoder wheel 164. The controller 170, electrically coupled to each optical sensor of the position sensor, can correlate an angular position of the encoder wheel 164 with cooking parameter selection. For example, each optical sensor can be configured to detect and distinguish a series of light and dark regions on the encoder wheel 164, wherein the processor determines direction and speed of rotation of the annular knob 161 according to a sequence of output state changes of the optical sensors over time. As in the example above, the annular knob 161 can thus be arranged wholly outside of the housing 110 with all input sensing components (e.g., optical sensors) arranged and sealed within the housing 110 such that moisture-sensitive components are protected against fluid ingress while enabling a user to conveniently enter, change, and/or select cooking parameters. However, the input region 160 that includes an annular knob can implement any other type of sensor, such as a capacitive sensor, a potentiometer, a mechanical encoder, mechanical switches, or contact-based or contactless sensor to detect rotation and/or the angular position of the knob 161.

In the foregoing implementation, as shown in FIG. 2B, the annular knob 161 can be further configured to depress substantially linearly along the second section 112, wherein the controller 170 is configured to receive the selected cooking parameter in response to depression of the annular knob 161. For example, the apparatus 100 can include a display 180, wherein the controller 170 outputs a temperature selection to be rendered on the display 180 according rotation of the annular knob 161, and wherein the controller 170 sets the temperature selection according to a most-recently displayed temperature when the annular knob 161 is depressed. Alternatively, the input region 160 can include a second button, wherein selection of the second button sets the selected temperature. For example, the second button can be arranged within the annulus of the annular knob 161, such as adjacent the display 180 also arranged within the annulus of the annular knob 161.

In another implementation, the input region 160 includes a set of buttons configured to receive cooking parameter inputs, such as shown in FIG. 3. For example, the input region 160 can include a first button and a second button, where selection of the first button corresponds to an increase in the selected temperature, and wherein selection of the second button corresponds to a decrease in the selected temperature. In this example, the input region 160 can include a third button, wherein selection of the third button corresponds to entry of the current selected temperature. However, the input region 160 can include any other one or more types or combination of types of sensors to capture a temperate selection or entry of any other cooking parameter, such as a continuous switch, a momentary switch, a capacitive touch sensor, a potentiometer, a dial, a touchscreen, etc.

As shown in FIGS. 2A and 5, one variation of the apparatus 100 further includes a display 180 arranged on the housing 110. Generally, the display 180 functions to display a user input (e.g., in conjunction with a cooking parameter or temperate selection entered into the input region 160) and/or a cooking parameter (e.g., while the apparatus 100 is in use). In one example implementation, the display 180 can include a backlit liquid crystal display substantially concentric with the annular knob 161 in the variation of the input region 160 that includes an annular knob, such as shown in FIG. 2A. In another example implementation, the display 180 and the input region 160 can be cooperatively embodied in a touch display, wherein a touch sensor (e.g., capacitive touch sensor) within the touch display defines the input region 160, and wherein the display of the touch display defines the display 180. Alternatively, the display 180 can be an LED segment display, an e-ink display, a plasma display, a set of labeled lamps (e.g., LEDs), or any other suitable type of color, black and white, segment, or dummy light display arranged in any other location on or within the housing 110.

In one implementation, the display 180 renders figures, symbols, and/or characters corresponding to cooking parameters to be entered by a user. For example in the implementation in which apparatus includes an annular knob, the display 180 can display a particular temperature corresponding to an angular position of the knob 161 (i.e. based on a sensed position of an optical encoder wheel on the annular knob 161). As a user rotates the knob 161, the display 180 can update the displayed temperature according to a new position of the knob 161. In another example, the display 180 can render images of food types, such as vegetable, pork, poultry, fish, and beef according to rotation of the annular knob 161 or selection of a scroll button on the input region 160. In further examples, the display 180 can update a cooking time (e.g., by increasing or decreasing an initial time displayed on a timer) or a food weight or volume (e.g., by increasing or decreasing a displayed weight one ounce at a time) according to rotation of the knob 161, selection of a scroll button, or any other input into the input region 160.

In the foregoing implementation, the display 180 can further cycle through these and/or other cooking parameters (e.g., desired cooking start time, desired cooking end time, etc.) in response to user selection of a current parameter rendered on the display 180. In one example, the display 180 can first render a temperate menu, wherein the display 180 updates a displayed temperature according to a knob position. In this example, depression of the knob 161 can enter the currently-displayed temperature into the controller 170, and the display 180 can switch to a timer menu, wherein the display 180 updates a displayed time according to a knob position. Depression of the knob 161 can enter the currently-displayed time into the controller 170, and the controller 170 can initiate fluid temperature regulation to cook the food in the cooking container. In another example, the display 180 can first render a food type menu, wherein the display 180 indexes through images of food types (e.g., fish, pork, beef, poultry, and vegetable) in response to rotation of the annular knob 161. In this example, depression of the knob 161 can enter the currently-displayed food type into the controller 170, and the display 180 can switch to a food quantity menu, wherein the display 180 updates a displayed food weight (e.g., ounces) according to a knob position. Depression of the knob 161 can enter the currently-displayed food weight into the controller 170, the controller 170 can set a cook time and temperature according to the food type and weight, and the controller 170 can then maintain the fluid in the cooking container within a predetermined range of temperatures (including the set cooking temperature) for the set cooking time by controlling the heating element 130 and the circulator 150.

The display 180 can additionally or alternatively be configured to render current cooking parameters as the apparatus 100 cooks the food product in the cooking container. For example, the display 180 can update a timer counting down the cooking time, such as by updating a new time every hour, every minute, or every second. In another example, the display 180 can update with a current temperature reading of the temperature sensor 140, such as with every degree change, every minute, or every five minutes. In yet another example, the display 180 can render both the current fluid temperature and the remaining time. The display 180 can alternatively switch between rendering the current fluid temperature, the remaining time, and/or other cooking parameters, such as every five seconds or in response to an input to the input region 160 (e.g., rotation of the annular knob 161). However, the display 180 can render any suitable or cooking-related information in any other way and according to any suitable schedule. The input region 160 (e.g., annular knob 161) and the display 180 can therefore cooperate to enable a user to navigate through menus, enter and set cooking parameters, and/or review cooking parameters while the apparatus 100 is in use.

As shown in FIG. 5, the controller 170 of the apparatus 100 is configured to control the heating element 130 and the circulator 150 according to a temperature of the fluid measured by the temperature sensor, thereby maintaining the fluid within a predetermined range of temperatures including the selected temperature. Generally, the controller 170 functions to control the heating element 130 and the circulator 150 according to cooking parameters and a fluid temperature sensed by the temperature sensor 140, thereby circulating heated cooking fluid (e.g., water) around the food product within the cooking container for a period of time, thereby cooking the food product.

Once cooking is initiated, such as by a user input into the input region 160, the controller 170 begins to heat the cooking fluid by switching on power to the heating element 130 and to the circulator 150. The controller 170 can continuously or cyclically poll the temperature sensor 140 and modify power settings to the heating element 130 and/or to the circulator 150 accordingly. The controller 170 can begin a cooking countdown timer when heating begins or once the selected or set cooking temperature is reached. The controller 170 then regulates the temperature of the cooking fluid until the cooking timer expires, at which time the controller 170 can ceases operation of the heating element 130 and the circulator 150. Furthermore, when the timer expires, the controller 170 can sound an audible alarm, trigger a visual alarm, send a text message, email, or other communication to a user (e.g., via Wi-Fi, via a cellular connection, over Bluetooth, etc.), and/or otherwise respond to expiration of the cooking timer. The apparatus 100 can therefore include a wireless communication module, such as a Wi-Fi, Bluetooth, ZigBee, cellular, or other wireless communication component, to transmit cooking-related data, alarms, etc. to a user.

In one example implementation, the controller 170 can implement a bang-bang controller to regulate the temperature of the cooking fluid. In this example implementation, the controller 170 maintains a substantially constant power to the circulator 150 throughout the cooking period but alternates between sending a full power signal to the heating element 130 when the sensed fluid temperature is below a target temperature (e.g., the selected temperature or a temperature set by the controller 170) and ceasing the power signal to the heating element 130 when the sensed fluid temperature is above the target temperature. The controller 170 can further implement hysteresis by setting a target temperature range including a high temperature target and a low temperature target, the selected temperature or the temperature set by the controller 170 between the high and low temperature targets. The controller 170 can thus alternate between sending a full power signal to the heating element 130 when the sensed fluid temperature is below the low target temperature and withholding the power signal to the heating element 130 when the sensed fluid temperature is above the high temperature target.

In another implementation, the controller 170 can implement closed-loop feedback to regulate the temperature of the cooking fluid. For example, the controller 170 can implement a PD (proportional-derivative), PI (proportional-integral), or PID (proportional-integral-derivative) controller that manipulates a current temperature reading and previous temperature readings to estimate a future temperature reading and adjusts power to the heating element 130 accordingly. In this implementation, the controller 170 can output a pulse-width modulated (PWM) signal, based on the closed-loop controller, to regulate current sent to the heating element 130 and therefore the thermal energy output from the heating element 130. Alternatively, the controller 170 can cycle the heating element 130 on and off according to the closed-loop controller. Furthermore, the controller 170 can cycle the circulator 150 on and off or adjust the power setting to the circulator 150 (e.g., via a PWM output signal) according to the closed-loop controller. For example, if the temperature of the fluid is too high or is rising too quickly, the controller 170 can increase the speed of the circulator 150 and reduce power to the heating element 130 to more rapidly lower the temperature of the fluid. Similarly, if the temperature of the fluid is too low or is dropping too quickly, the controller 170 can decrease the speed of the circulator 150 and increase power to the heating element 130 to more rapidly increase the temperature of the fluid. However, the controller 170 can function in any other way and implement any other suitable control algorithm or feedback to regulate the temperature of the cooking fluid.

The controller 170 can further estimate an amount of time required for the fluid to return to room temperate after cessation of power to the heating element 130 (and to the circulator 150. For example, the controller 170 can estimate the total volume in the container, such as based on the amount of power required to raise the temperature of the fluid by a certain amount. The controller 170 can then estimate the heat capacity of the volume (e.g., fluid and food product) within the container and the amount of time for the volume to cool based on the container volume estimate and an estimated specific heat capacity of the fluid (e.g., 4181.3 J/(kg·K) for water). Alternatively, the input region 160 can receive a cooking parameter that includes the volume of cooking fluid. The controller 170 can then adjust the total cooking time based on the estimated time to cool the cooking fluid, such as to a particular temperature threshold at which the food product ceases cooking or to room temperature (e.g., 72° F.).

The controller 170 can additionally or alternatively receive a current motor setting and estimate a level of fluid within the cooking container based on the motor setting. For example, the controller 170 can interface with an ammeter to determine a current draw of the motor 152 at a first PWM frequency of a motor driver (shown in FIG. 6) and then convert the current draw into a motor load. The controller can subsequently implement a linear, square, cubic, exponential, or other function to relate the motor load to a height of fluid in the container. Similarly, the controller 170 can interface with a motor control feedback circuit to calculate a back-EMF of the motor 152 at a first PWM frequency of the motor driver and then convert the back-EMF into a motor load. The controller can then relate the motor load to a height of fluid in the container. However, the controller 170 can interface with and/or receive data from a hall effect sensor, encoder, or any other sensor to determine a speed of the motor 152 and/or the impeller 156 and manipulate this data to estimate a fluid volume in the cooking container, such as at a first or initial power setting of the motor. The controller 170 can then adjust a power signal to the motor 152 (e.g., PWM frequency of a control signal to the motor 152 driver) based on the estimated fluid level in the cooking container, such as from a first power setting at which the fluid level is estimated to a second power for a low fluid level or for a cavity blockage and a third setting correlated with an impeller speed associated with laminar fluid flow through the cavity at the estimated fluid level within the cooking container. For example, the controller 170 can correlate a current draw of the motor 152 below a low threshold value with a fluid level in the cooking container below a threshold minimum and/or dry running of the apparatus 100 (i.e. running in air). In this example, the controller 170 can transition the circulator to the second power setting that is 'OFF' and/or cut (or restrict) power to the heating element 130 in response to a detected low fluid level in the cooking container or dry running to prevent damage to the device. Similarly, the controller 170 can correlate a current draw of the motor 152 above a high threshold value with blockage of the cavity, such as blockage of the elongated fluid in let by the sealed pouch. In this example, the controller 170 can transition the circulator to the second power setting and cut power to the heating element 130 in response to detected blockage of the cavity. In yet another example, when the controller 170 correlates a current draw of the motor 152 with a fluid level in the container within an allowable range of fluid levels, the controller 170 can adjust the power signal to the motor 152 to the third setting correlated with an impeller speed that yields laminar fluid flow through the cavity at the estimated fluid level in the cooking container. In this example, because thermal energy can be dissipated into the cooking fluid more efficiently with laminar flow rather than turbulent flow through the cavity, the controller 170 can set the speed of the circulator 150 to maintain a substantially satisfactory rate of fluid flow through the cavity without transitioning to turbulent flow. Furthermore, in this example, the controller 170 can set the third power setting by adjusting a PWM frequency of a control signal to the motor 152 driver or in any other suitable way. Therefore, the controller 170 can set the speed of circulator according to a determined fluid height within the cooking container.

The controller 170 can be a processor (e.g., microprocessor), microcontroller, integrated circuit, or other analog or digital circuitry configured to receive a cooking parameter (e.g., temperature selection) from the input region 160 and a temperature-dependent signal from the temperature sensor 140 and to output signals to control the circulator 150, to control the heating element 130, and/or to control the display 180, as shown in FIG. 5. In one example implementation, the controller 170 outputs a first low-current signal (e.g., a digital signal, a digital pulse-width modulated signal) to a first relay to control a high-current power signal to the circulator 150 and a second low-current signal to a second relay to control a high-current power signal to the heating element 130. In the variation of the apparatus 100 that includes a display 180, the controller 170 can also output one or more low-voltage signals to a display driver that controls the output of the display 180. The controller 170 can be further connected to a multiplexer that combines outputs from various sensors of the input region 160, such as each of a set of position sensors or electrodes of a capacitive touch display, into a single digital signal. However, the controller 170 can handle inputs (e.g., from the temperature sensor 140) and outputs (e.g., a control signal for the heating element 130) in any other suitable way.

In one implementation, the controller 170 further functions to set cooking parameters. As described above, the controller 170 can select a cooking time and a cooking temperature based on an entered food type and/or food quantity. In one implementation, the controller 170 implements a set of parametric models to set cooking parameters, each parametric model in the set associated with a particular type of food and defining an algorithm that outputs a cooking time and/or a cooking temperature based on a weight, volume, and/or shape of a particular type of food. For example, the set of parametric models can include at least one parametric model for beef, at least one parametric model for fish, at least one parametric model for pork, at least one parametric model for poultry, and at least one parametric model for vegetables. Each parametric model can be associated with a particular shape of food, subset of a type of food, or a cooking style. For example, the set of parametric models can include several models associated with beef, such a steak model, a filet model, a tenderloin model, and a roast model. The models can also include a well-done steak model, a medium-done steak model, and a rare steak model. The set of parametric models can further include several models associated with vegetables, such a starchy vegetable model and a leafy vegetable model.

In another implementation, the controller 170 implements non-parametric models to set cooking parameters. In one example implementation, the controller 170 accesses a set of lookup tables to determine appropriate cooking parameters. For example, each lookup table can be associated with a particular food type and/or food shape and thus output a particular cooking time and/or cooking temperature based on a lookup table food weight or volume most closely approximating the food weight or volume entered by a user. The controller 170 can also interpolate cooking parameters based on the lookup tables and the entered food weight or volume.

Generally, the controller 170 can implement parametric models, non-parametric models, or static cooking time and temperature settings to set the cooking time and/or cooking temperature based on any one or more of a particular type of food, a particular shape of food, a particular cooking style, or any other cooking parameter or preference entered by a user. As shown in FIG. 5, the controller 170 can therefore implement a memory module or any other suitable form of data storage to store one or more parametric models, non-parametric models, and/or static cooking time and temperature settings related to any one or more cooking parameters. The controller 170 can also communicate wirelessly (e.g., via a Bluetooth, Wi-Fi, or cellular connection) with an external electronic device (e.g., a smartphone, a tablet, a computer) to download cooking parameters. However, the controller 170 can function in any other way to set cooking parameters.

As shown in FIGS. 3 and 6, one variation of the apparatus 100 further includes a power adapter including a plug 194 configured to engage an electrical wall outlet 116 and a rectifier and a relay electrically coupled to the plug 194. The power adapter 190 functions to communicate power from a wall receptacle (e.g., a standard residential 120 VAC wall outlet 116) to components of the apparatus 100, such as the controller 170 and/or the heating element 130, the circulator 150, the temperature sensor 140, the input region 160, the display 180, etc. based on one or more outputs of the controller 170.

In one implementation, the power adapter 190 defines a wall power adapter including power electronics to provide power signals (e.g., conditioned high-current signals) to high-power components of the apparatus 100, such as the heating element 130 and/or the circulator 150. In this implementation, the power adapter 190 can enable the apparatus 100 to be turned on and cooking parameters to be set prior to communication of a high-voltage and/or high-current signal to the housing 110. For example, when turned on, the apparatus 100 can source a low-current and/or low-voltage signal (e.g., 12 VDC, 100 mA peak signal) from the power adapter 190. In this example, only once cooking parameters are set and a user is ready to begin cooking will the controller 170 source a high-current and/or high-voltage signal (e.g., 120 VAC, 10 A peak signal) from the power adapter 190, such as by switching on a relay within the power adapter 190. Therefore, the power adapter 190 can include a rectifier, voltage regulator, and/or one or more relays, as described above, wherein the rectifier 192 and voltage regulator cooperate to communicate a low-power signal to the controller 170, the temperature sensor 140, the input region 160, and/or the display 180, and wherein the relays (e.g., relay 191), controlled by low-power signals from the controller 170, control communication of high-power signals to the heating element 130, to the circulator 150, etc. Similarly, the power adapter 190 can communicate a DC power signal to the controller 170, the temperature sensor 140, the input region 160, the circulator 150 (e.g., motor), and/or the display 180 within the immersion apparatus 101, and the controller 170 can control a relay within the power adapter 190 to control an AC power signal to the heating element 130.

The immersion apparatus 101 can also include a socket, and the power adapter 190 can further include a power cord configured to be transiently coupled to the socket, as shown in FIG. 3. Alternatively, the power adapter 190 can be substantially permanently coupled to the immersion apparatus 101 by the power cord that extends from the power adapter 190 to the immersion apparatus 101. In this implementation, the power cord can include multiple power (e.g., high-current and/or high-voltage) lines and/or multiple digital (e.g., low-power) lines. For example, as shown in FIG. 6, the controller 170 can source power from the rectifier 192 over a direct current wire within the power cord and transmit the digital signal to the relay 191 over a digital wire within the power cord. Furthermore, the heating element 130 can source power from the relay 191 over a pair of alternating current wires within the power cord, and the heating element 130 can be grounded by a first ground wire within the power cord and the circulator 150, controller, input region, etc. can be grounded by a second ground wire within the power cord. Therefore, the cord can include the direct current wire, the digital wire, the pair of alternating current wires, and an AC and a DC ground wire for a total of six digital and current-carrying wires within the cord. However, the cord can communicate any other power or digital signal in any other way over any other number of wires between the immersion apparatus 101 and the power adapter 190. Furthermore, the power adapter 190 can function in any other way to communicate power from a wall outlet 116 to components within the housing 110.

In the foregoing variation, the apparatus 100 can further include a moisture sensor configured to detect immersion of the second section 112 of the housing 110 into the cooking fluid, wherein the controller 170 shuts off high-power signals from the power adapter 190 to the circulator 150 and/or to the heating element 130 when the moisture sensor detects moisture in the second section 112. Alternatively, the apparatus 100 can include a tilt sensor, wherein the controller 170 correlates a tilt angle of the housing 110 greater than a threshold angle as an unsafe configuration for operation (e.g., the housing 110 is laying on its side), and wherein the controller 170 shuts off high-power signals from the power adapter 190 to the circulator 150 and/or to the heating element 130 when an unsafe configuration is detected. Therefore, in the foregoing variations, if the housing no is accidentally dropped or fully submerged in the fluid in the cooking container, the controller 170 can cooperate with the power adapter 190 and another sensor in the apparatus 100 to cease communication of a high-power signal (e.g., high-current and/or high-voltage signal) to the housing 110. However, the controller 170 can cooperate with any other suitable sensor to control operation of components within the apparatus 100 in any other suitable way.

The apparatus, system, and method of the embodiments can be embodied and/or implemented at least in part as a machine configured to receive a computer-readable medium storing computer-readable instructions. The instructions are executed by computer-executable components integrated with the apparatus 100, the controller 170, the display 180, hardware/firmware/software elements of an system or hand-held computing device, or any suitable combination thereof. Other systems and methods of the embodiments can be embodied and/or implemented at least in part as a machine configured to receive a computer-readable medium storing computer-readable instructions. The instructions are executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any other suitable dedicated hardware device can (alternatively or additionally) execute the instructions.

As a person skilled in the art of low-temperature cooking-style cooking will recognize from the previous detailed description and from the figures and claims, modifications and changes can be made to the preferred embodiments of the invention without departing from the scope of this invention defined in the following claims.

We claim:

1. An apparatus for cooking, comprising:
   a housing comprising a first section defining a cavity, an elongated fluid aperture fluidly connecting a housing exterior to the cavity, and a fluid outlet and a second section adjoining the first section, the second section comprising a sealed internal chamber;
   a clip arranged on the housing adjacent the elongated fluid aperture;
   a controller arranged within the sealed internal chamber;
   a heating element arranged within the cavity and electrically connected to the controller;
   a temperature sensor coupled to the housing and electrically connected to the controller;
   a circulator arranged within the housing and fluidly connected to the elongated fluid aperture;
   a display arranged along the second section of the housing and electrically connected to the controller;
   a contactless position sensor arranged within the sealed internal chamber and electrically connected to the controller; and
   an annular knob arranged external the sealed internal chamber and encircling the display and contactless position sensor, the annular knob comprising an indexing component coupled to the contactless position sensor.

2. The apparatus of claim 1, wherein the circulator comprises an impeller arranged within the cavity and a motor arranged within the sealed internal chamber, wherein the motor is electrically connected to the controller.

3. The apparatus of claim 1, wherein the sealed internal chamber is waterproofed.

4. The apparatus of claim 2, wherein the impeller is arranged adjacent the fluid outlet.

5. The apparatus of claim 1, wherein the elongated fluid aperture extends in parallel with a longitudinal axis of the apparatus, and the clip is aligned with the elongated fluid aperture.

6. The apparatus of claim 1, further comprising a plurality of fluid apertures defined along a longitudinal surface of the apparatus, wherein the elongated fluid aperture is the largest of the fluid apertures defined along the longitudinal surface.

7. The apparatus of claim 1, wherein the sealed internal chamber has a second ingress protection rating of at least 4.

8. The apparatus of claim 1, wherein the clip comprises a spring and an elongated member, the elongated member pivotably coupled to the housing and biased against the housing by the spring.

9. The apparatus of claim 1, wherein the heating element comprises a positive temperature coefficient ceramic heating element.

10. The apparatus of claim 1, further comprising a heatsink thermally coupled to the heating element and comprising a set of fins extending into the cavity.

11. The apparatus of claim 10, wherein each fin in the set of fins extends linearly along a portion of the length of the cavity, and wherein the heating element defines an elongated heating element substantially encased within the heatsink.

12. The apparatus of claim 1, further comprising a power adapter electrically connected to the controller by a power cable, the power adapter enclosed by a fluid permeable power adapter housing separate and distinct from the housing.

13. The apparatus of claim 1, wherein the temperature sensor comprises a thermistor arranged within the cavity proximal the elongated fluid aperture.

14. The apparatus of claim 1, wherein the display is arranged along the sealed internal chamber.

15. The apparatus of claim 14, wherein the display comprises a touch screen.

16. The apparatus of claim 1, further comprising a first button and a second button arranged on the second section electrically connected to the controller.

17. A controller for a cooking apparatus, comprising:
   a housing comprising a first section defining a cavity and an elongated fluid aperture fluidly connecting a housing exterior to the cavity and a second section adjoining the first section, the second section comprising a sealed internal chamber;
   an annular knob arranged external the sealed internal chamber, the annular knob comprising an indexing component;
   a contactless position sensor arranged within the sealed internal chamber and coupled to the indexing component;
   a display arranged along the second section of the housing substantially concentric with the annular knob;
   a heating element arranged within the cavity;
   a circulator arranged within the cavity and fluidly connected to the elongated fluid aperture; and
   a controller electrically connected to the contactless position sensor, display, and heating element.

18. The apparatus of claim 17, wherein the second section comprises a distal end, opposite the first section, of a substantially circular cross-section, wherein the knob encircles the display and is arranged over the distal end of the sealed internal chamber, and wherein the display comprises a backlit liquid crystal display arranged on the distal end of the second section substantially concentric with the annular knob.

19. The apparatus of claim 17, wherein the indexing component comprises a magnetic element, wherein the position sensor comprises a set of magnetic field sensors arranged within the sealed internal chamber.

20. The apparatus of claim 17, wherein the knob comprises an optical encoder wheel, and wherein the position sensor comprises a set of optical sensors arranged within the sealed internal chamber.

21. The apparatus of claim 17, wherein the annular knob comprises a linear actuator arranged with an actuation axis normal a display face.

22. The apparatus of claim 21, wherein the display is arranged along the sealed internal chamber.

23. The apparatus of claim 17, further comprising a power adapter electrically connected to the controller by a power cord, the power adapter comprising:
   a wall socket plug;
   power electronics electrically connected between the wall socket plug and the controller; and
   a power adapter housing, separate and distinct from the housing, enclosing the power electronics.

24. An apparatus for cooking, comprising:
   a power adapter comprising a plug and a rectifier and a relay electrically coupled to the plug; and an immersion apparatus separate and distinct from the power adapter and electrically coupled to the power adapter by a power cord, the immersion apparatus comprising:
  a housing comprising a first section, the first section defining a fluid inlet and a fluid outlet fluidly coupled to a cavity and a second section adjoining the first section, the second section defining a waterproofed chamber,
  a clip arranged on the housing adjacent the fluid inlet,
  a heating element arranged within the cavity,
  a temperature sensor coupled to the housing,
  a circulator arranged within the housing and fluidly connected to the cavity,
  an input region arranged on the second section of the housing, the input region comprising:
    a rotary knob encircling an exterior of the water roofed chamber;
    a contactless position sensor arranged within the waterproofed chamber, the contactless position sensor physically disconnected from the rotary knob, and
  a controller arranged within the waterproofed chamber and electrically connected to the power adapter, heating element, temperature sensor, circulator, and contactless position sensor.

25. The apparatus of claim 24, wherein the immersion apparatus further comprises a socket arranged along the second section and electrically connected to the controller, wherein the power cord is transiently coupled to the socket.

26. The apparatus of claim 25, wherein the controller is electrically connected to the rectifier by a direct current wire and digitally connected to the relay by a digital wire, wherein the heating element is electrically connected to the relay by a pair of alternating current wires, and wherein the power cord comprises the direct current wire, the digital wire, and the alternating current wires.

27. The apparatus of claim 24, wherein the circulator defines an impeller and a motor, waterproofed chamber, and wherein the motor is electrically isolated from the impeller by a polymer coupling.

* * * * *

UNITED STATES PATENT AND TRADEMARK OFFICE
CERTIFICATE OF CORRECTION

| | |
|---|---|
| PATENT NO. | : 9,215,948 B2 |
| APPLICATION NO. | : 13/780890 |
| DATED | : December 22, 2015 |
| INVENTOR(S) | : Abraham Fetterman et al. |

It is certified that error appears in the above-identified patent and that said Letters Patent is hereby corrected as shown below:

In The Claims

In column 21, lines 17-18, "water roofed" should read --waterproofed--

Signed and Sealed this
Eighth Day of March, 2016

Michelle K. Lee
*Director of the United States Patent and Trademark Office*